US011741993B2

(12) United States Patent
Goker et al.

(10) Patent No.: US 11,741,993 B2
(45) Date of Patent: Aug. 29, 2023

(54) METHOD OF TOTAL DIMENSIONAL STABILITY CONTROL IN MAGNETIC TAPE SYSTEM WITH GLOBAL CALIBRATION DATA

(71) Applicant: QUANTUM CORPORATION, San Jose, CA (US)

(72) Inventors: Turguy Goker, Oceanside, CA (US); James P. Peng, Santa Maria, CA (US); Hoa Le, Orange, CA (US); Louie Almero, Cerritos, CA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 17/875,182

(22) Filed: Jul. 27, 2022

(65) Prior Publication Data

US 2023/0075986 A1 Mar. 9, 2023

Related U.S. Application Data

(60) Provisional application No. 63/240,884, filed on Sep. 4, 2021.

(51) Int. Cl.
*G11B 20/10* (2006.01)
*G11B 5/008* (2006.01)
*G11B 20/12* (2006.01)

(52) U.S. Cl.
CPC .... *G11B 20/10481* (2013.01); *G11B 5/00813* (2013.01); *G11B 20/1201* (2013.01)

(58) Field of Classification Search
None
See application file for complete search history.

(56) References Cited

U.S. PATENT DOCUMENTS

| | | | | | |
|---|---|---|---|---|---|
| 5,216,556 | A | * | 6/1993 | Steinberg | G11B 15/43 360/71 |
| 5,819,309 | A | * | 10/1998 | Gray | G11B 15/07 360/134 |
| 2007/0204123 | A1 | * | 8/2007 | Saliba | G11B 33/125 |
| 2011/0199702 | A1 | * | 8/2011 | Hoerger | G11B 5/584 |
| 2016/0189737 | A1 | * | 6/2016 | Poorman | G11B 5/584 360/77.12 |
| 2020/0301774 | A1 | * | 9/2020 | Breuer | G11B 5/3189 |
| 2023/0075986 | A1 | * | 3/2023 | Goker | G11B 5/00813 |

* cited by examiner

*Primary Examiner* — Peter Vincent Agustin
(74) *Attorney, Agent, or Firm* — ROEDER & BRODER LLP; James P. Broder

(57) ABSTRACT

A method for generating calibration data useful for calibrating a plurality of tape cartridges includes the steps of selecting a subset of tape cartridges from the plurality of tape cartridges, the subset of tape cartridges having fewer tape cartridges than the plurality of tape cartridges; calibrating each of the subset of tape cartridges using a plurality of tape drives to generate global calibration data; selecting one of the plurality of tape cartridges that is not included within the subset of tape cartridges; and calibrating the one of the plurality of tape cartridges using the global calibration data generated via the calibrating of each of the subset of tape cartridges.

20 Claims, 5 Drawing Sheets

METHOD OF TOTAL DIMENSIONAL STABILITY CONTROL IN MAGNETIC TAPE SYSTEM WITH GLOBAL CALIBRATION DATA

RELATED APPLICATION

This application claims priority on U.S. Provisional Application Ser. No. 63/240,884 filed on Sep. 4, 2021 and entitled "METHOD OF TOTAL DIMENSIONAL STABILITY CONTROL IN MAGNETIC TAPE SYSTEM WITH GLOBAL CALIBRATION DATA". As far as permitted, the contents of U.S. Provisional Application Ser. No. 63/240,884 are incorporated in their entirety herein by reference.

BACKGROUND

Automated tape library systems (or "tape libraries") are commonly utilized for purposes of writing data to and reading data from magnetic tape cartridges. Magnetic tape cartridges are configured to retain and/or store magnetic tape that can be used in a magnetic tape drive for purposes of writing data to and reading data from the magnetic tape. Magnetic tape cartridges have been used extensively because they provide a convenient way to house and support a length of magnetic tape for engagement by a transducer (or tape head, sometimes simply referred to as a "head") in the tape drive while protecting the tape upon removal of the cartridge. Moreover, magnetic tape cartridges facilitate economic and compact storage of data. During use of the magnetic tape drive, a tape head of the magnetic tape drive is configured to be in direct contact with the magnetic tape from the magnetic tape cartridge so that data can be written to and read from the magnetic tape in a series of data tracks and/or data bands as the magnetic tape moves across the tape head at varying speed from low speed to high speed. This head-to-tape contact requirement is also required to sense the servo signals from the tape by the magnetic head which is a key requirement of tape format used for tasks such as tracking, tape speed, tape position and dimensional stability control. Such tape heads can include dedicated write heads, dedicated read heads, or combination read/write heads, plus the servo sense head elements.

Over the years, storage capacity within individual tape cartridges has increased dramatically, with such storage capacity being typically doubled for each new generation of storage media, e.g., approximately every two to three years. It is appreciated that tape capacity growth is a function of multiple variables, with the areal density of the tape being a main contributor to the tape capacity growth. Areal density is defined by the size and shape of the written bit, which is typically rectangular-shaped. More particularly, the areal density can be defined as a product of the bit length (or linear density of the recording) and the bit width (or track pitch). The size and shape of the written bit can also be described in terms of the Bit Aspect Ratio (BAR), which is the ratio of the track pitch to the bit length. It is further appreciated that the selection of track pitch and bit length (or linear density) is done based on tracking, dimensional stability, and magnetic recording, which is dominated by head and media interface and design.

In the past, the management of transverse (or total) dimensional stability (TDS) issues was done by statistical tolerance control. Each component had limits on how much variation from design parameters was allowed. As track density and/or areal density increased, the allowable limits for variation were also decreased. However, to continue to increase track density and/or areal density to support high tape cartridge capacities, this method is no longer feasible, as components cannot be made at lower variation. Additionally, for any change of the variation factor, the corresponding TDS response is viscoelastic, with a long time required to reach equilibrium. Consequentially, methods to minimize TDS, such as tension-controlled shuttling after/before each cartridge load/unload, start to become an unbearable burden to the tape library functionality.

It is appreciated that tape lateral dimension changes due to humidity as well as other conditions such as temperature and aging and creep. However, the humidity is the main contributor to such lateral dimensional changes to the tape. As a result, data tracks written in one condition may not be able to be accurately read in another condition if the tape substrate has experienced dimensional changes, and if track pitch and magnetic head dimensions for writers and readers don't have the required margins and tolerances. For example, changes in environmental conditions from the time of initial writing of the data tracks can cause issues with the ability of the tape drive to accurately read the data tracks if they are being read in environmental conditions that are different than when the data tracks were written and/or trimmed. Therefore, current systems with high track (or areal) densities and substrates having high sensitivity to environmental conditions require tighter environmental conditions which increases overall cost.

In various applications, the magnetic tape drive can operate in compliance with a Linear Tape Open (LTO) specification, such as LTO-8 or LTO-9, with the magnetic tape cartridges being LTO-compatible tape cartridges that retain LTO-compatible magnetic tape. Current LTO-9 operating point requires narrower tracks to increase areal densities, while using similar tape substrates with similar or improved TDS characteristics as previous generations where wider tracks were used. The LTO format is an open format magnetic tape data storage technology that enables users to have access to multiple sources of storage media products that will be compatible with one another.

Current LTO-9 requires every tape cartridge to be calibrated once by drives at first load. This can be referred to as a per tape calibration method. Calibration for each tape cartridge typically requires 60 minutes, which is about 30 beginning of tape (BOT) to end of tape (EOT) tape motions, commonly referred to as tape shuttling, resulting in approximately 30,000-meter tape pass across the heads for each calibration.

In a typical hyperscale application with a 125:1 cartridge-to-drive ratio (10,000 cartridges and 80 drives in an enterprise class library as an example), this will require 125 hours of total calibration time before the system can be used for writing and reading. This means, each drive will experience at least 3.75 million meters of tape motion (in a typical per tape calibration a process will require one hour tape motion that may result in 30 full tape passes of a 1000-meter tape), where total life of the tape head is 50 million meters minimum.

Basically, before the user writes one byte of data, the tape heads will have at least 3.75 million meters of tape motion and 125 hours of motion in this example case. In addition to this, with current head cleaning requirement by drive firmware (FW) being 100 hours, the tape library will generally be required to clean the tape drives directly after the calibration process, which further complicates the use of tape libraries. It is noted that even tape drives and tape libraries avoid cleaning after initialization, when the user starts writing data the application may experience excessive rewrites due to debris clogged head elements resulting from this calibration process where drive uses large number of green media. Given the fact that all the current media is green media, meaning unused media with highest degree of abrasivity, this process will result in early head wear, premature cleaning and head coating compromization limiting the useful life of tape drives, which can be a key problem especially for hyperscale applications.

Unfortunately, it is not feasible to conduct such per tape calibration methodology at the factory level. In particular, using tape drives to calibrate each tape cartridge at the factory level is not an economic solution due to cost and also long shipment delays, which can increase the cost of each tape cartridge massively at the factory level. Therefore, manufacturers or vendors would think this is best done at the user's site. For example, assume the vendor has 100,000 tape cartridges and wants to calibrate each before selling and has one week to calibrate every tape cartridge. Thus, to calibrate 100,000 tape cartridges in one week, the vendor must have a minimum of 400 LTO-9 tape drives plus multiple large scale enterprise tape libraries to hold them, so this is not an economical solution.

As areal densities increase above 8 Gbit-per-inch$^2$, both LTO and enterprise tape operating points (track and bit densities) require less than 1500 nm narrow track pitches making the dimensional stability of flexible thin media over the environmental conditions and over storage time a real challenge to manage. Since producing dimensionally very stable flexible thin tape media substrates to support the future high areal densities is extremely costly especially at high volumes, new innovative drive technologies are needed to deal with the overall tape dimensional stability problem which will get more and more demanding as track densities continue to increase.

SUMMARY

The present invention is directed toward a method for generating calibration data useful for calibrating a plurality of tape cartridges. In various embodiments, the method includes the steps of selecting a subset of tape cartridges from the plurality of tape cartridges, the subset of tape cartridges having fewer tape cartridges than the plurality of tape cartridges; calibrating each of the subset of tape cartridges using a plurality of tape drives to generate global calibration data; selecting one of the plurality of tape cartridges that is not included within the subset of tape cartridges; and calibrating the one of the plurality of tape cartridges using the global calibration data generated via the calibrating of each of the subset of tape cartridges.

In some embodiments, the calibration data is stored in an internal memory of each of the plurality of tape cartridges.

In certain embodiments, each of the subset of tape cartridges is individually calibrated using each of the plurality of tape drives.

In some embodiments, the subset of tape cartridges includes less than approximately 75% of the number of tape cartridges in the plurality of tape cartridges.

In other embodiments, the subset of tape cartridges includes less than approximately 50% of the number of tape cartridges in the plurality of tape cartridges.

In still other embodiments, the subset of tape cartridges includes less than approximately 25% of the number of tape cartridges in the plurality of tape cartridges.

In yet other embodiments, the subset of tape cartridges includes less than approximately 10% of the number of tape cartridges in the plurality of tape cartridges.

In various embodiments, the subset of tape cartridges includes at least ten tape cartridges.

In certain embodiments, the plurality of tape drives includes at least three tape drives.

In some embodiments, the step of calibrating includes calibrating each of the subset of tape cartridges under known environmental conditions.

In certain embodiments, the method can include the step of aging and dehumidifying each of the subset of tape cartridges prior to the step of calibrating each of the subset of tape cartridges.

In some embodiments, the step of calibrating the one of the plurality of tape cartridges includes the steps of calibrating the one of the plurality of tape cartridges in a first tape drive that includes a drive controller; and selectively adjusting a tape tension of a tape retained within the one of the plurality of tape cartridges with the drive controller based at least in part on the calibration data generated via the calibrating of each of the subset of tape cartridges. The calibration data can be stored within the first tape drive.

In certain embodiments, the step of selectively adjusting includes selectively adjusting the tape tension of the tape retained within the one of the plurality of tape cartridges with the drive controller based at least in part on the calibration data generated via the calibrating of each of the subset of tape cartridges in comparison to actual environmental conditions existing during calibration of the one of the plurality tape cartridges.

In one embodiment, the step of calibrating the one of the plurality of tape cartridges further includes the step of controlling the first tape drive with the drive controller to write data to fewer than a total number of data tracks on the tape when the drive controller determines that the tape tension cannot be adjusted sufficiently to ensure accurate alignment between a head assembly of the first tape drive and each of the data bands on the tape.

In some embodiments, each of the plurality of tape cartridges is included within a category of tape cartridges that includes at least a first characteristic.

In one embodiment, the first characteristic includes a material of a tape substrate of a tape retained within the tape cartridge.

In another embodiment, the first characteristic includes a servo writer used to write servo tracks onto a tape retained within the tape cartridge.

In certain embodiments, the method further includes the steps of selecting a second subset of tape cartridges from a second plurality of cartridges, the second subset of tape cartridges having fewer tape cartridges than the second plurality of tape cartridges; and calibrating each of the second subset of tape cartridges using the plurality of tape drives to generate second calibration data.

In some embodiments, each of the plurality of tape cartridges is included within a category of tape cartridges that includes at least a first characteristic; and each of the second plurality of tape cartridges is included within a second category of tape cartridges that includes at least a second characteristic that is different from the first characteristic.

The present invention is further directed toward a calibration system for generating calibration data useful for calibrating a plurality of tape cartridges, the calibration system including a subset of tape cartridges that are selected from the plurality of tape cartridges, the subset of tape cartridges having fewer tape cartridges than the plurality of tape cartridges; and a plurality of tape drives that are usable for calibrating each of the subset of tape cartridges to generate global calibration data; wherein one of the plurality of tape cartridges that is not included within the subset of tape cartridges is selected and calibrated using the global calibration data generated from calibrating each of the subset of tape cartridges.

The present invention is also directed toward a method for generating calibration data useful for calibrating a plurality of tape cartridges, each of the plurality of tape cartridges being included within a category of tape cartridges that includes at least a first characteristic, the method including the steps of selecting a subset of tape cartridges from the plurality of tape cartridges, the subset of tape cartridges including at least ten tape cartridges, which is less than approximately 25% of the number of tape cartridges in the plurality of tape cartridges; individually calibrating each of the subset of tape cartridges under known environmental conditions using each of a plurality of tape drives to generate global calibration data, the plurality of tape drives including at least three tape drives; storing the global calibration data in an internal memory of each of the plurality of tape cartridges; selecting one of the plurality of tape cartridges that is not included within the subset of tape cartridges; and calibrating the one of the plurality of tape cartridges using the global calibration data generated via the step of individually calibrating each of the subset of tape cartridges.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a method of total (or transverse) dimensional stability control in a magnetic tape system using global calibration data. More specifically, the present invention is directed toward a method of manufacturing magnetic tape cartridges that implements a sample-based system where only selected subsets of different categories of tape cartridges are calibrated in order to generate global calibration data (GCD) that is more broadly applicable for each category of tape cartridges.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
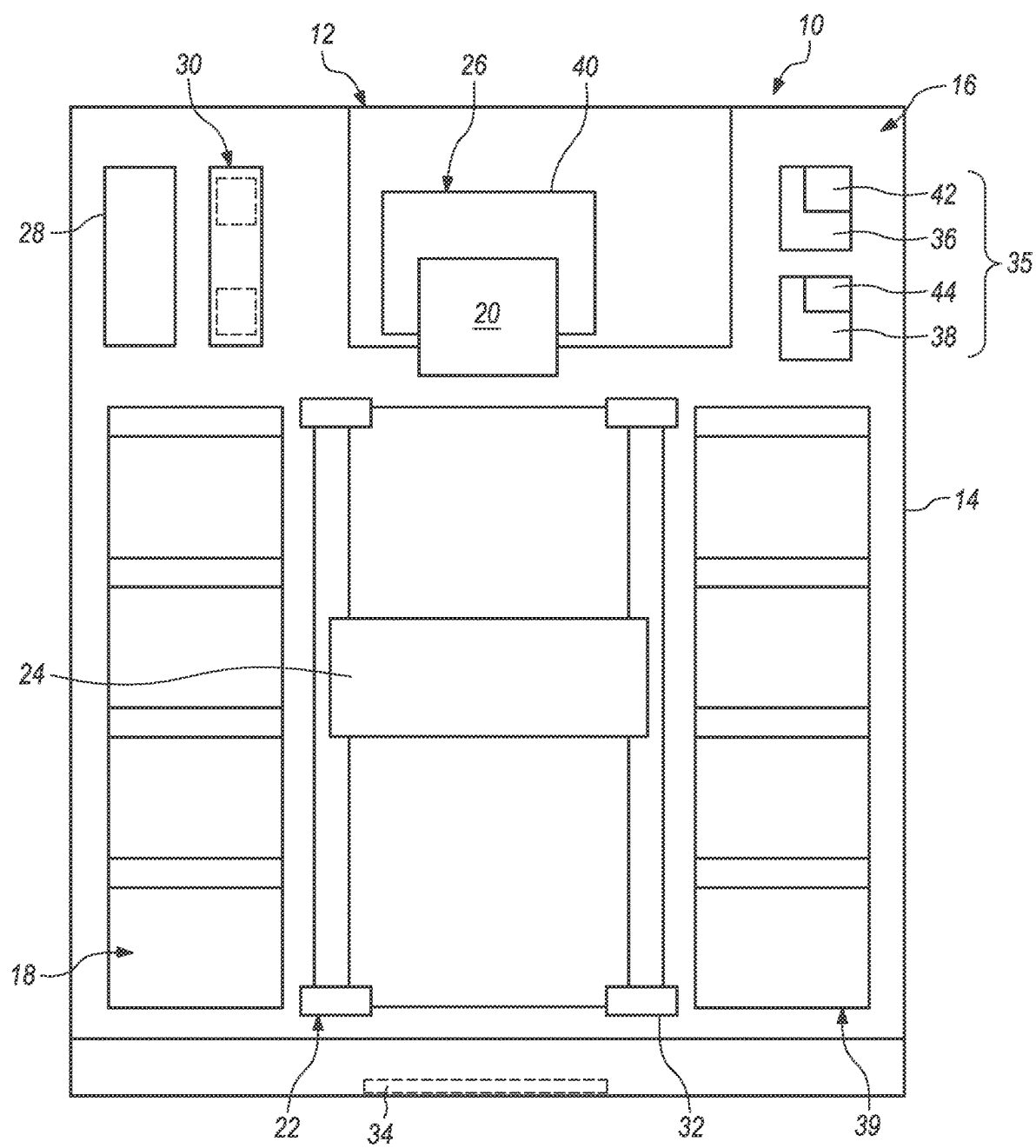
FIG. 1 is a simplified schematic top view illustration of an embodiment of an automated tape library system having features of the present invention.

FIG. 1 is a simplified schematic top view illustration of an automated tape library system 10 (also referred to herein simply as a "tape library") having features of the present invention, the tape library 10 including a tape drive system 12 that includes one or more tape drives 26 that are usable for writing data to and reading data from magnetic tape 250 (illustrated in FIG. 2) that is retained within a tape cartridge 20. In FIG. 1, a top cover (not shown) has been omitted for clarity so that the interior of the tape library 10 is visible. The design of the tape library 10 can be varied as desired. In particular, the tape library 10 can have any suitable design that is capable of storing a plurality of tape cartridges 20 and using one or more tape drives 26 to write data to and read data from the plurality of tape cartridges 20. More specifically, it is noted that the tape library 10 illustrated in FIG. 1 is just one non-exclusive example of a tape library 10 usable with the present invention, and no limitations are intended based on the specific type and/or size of the tape library 10 shown in FIG. 1.

In various embodiments, as illustrated in FIG. 1, the tape library 10 can include one or more of: (i) a library housing 14 that defines a library interior 16, (ii) a plurality of storage slots 18 that are each configured to receive and selectively retain (and store) a tape cartridge 20, (iii) a rack assembly 22 including one or more racks 32, (iv) a tape cartridge retrieval assembly 24 (also sometimes referred to herein as a "retrieval assembly"), (v) the tape drive system 12 including the one or more tape drives 26, (vi) a power supply 28, (vii) a library control system 30, (viii) a graphical user interface 34 (illustrated in phantom, and also sometimes referred to herein as a "GUI"), and (ix) a climate controller 35. In some embodiments, the climate controller 35 can include one or more temperature controllers 36 (only one temperature controller 36 is illustrated in FIG. 1), and/or one or more humidity controllers 38 (only one humidity controller 38 is illustrated in FIG. 1).

As an overview, in various embodiments, the present invention focuses strictly on the process and use of multiple calibration databases stored in a cartridge memory chip 270

(illustrated in FIG. 2) (CM) of each tape cartridge 20, where one is based on global calibration data done before the tape cartridges 20 are used either at factory or other places, and another is per tape calibration data which is based on the current process but done only when the system requires it due to a corner case error or recovery case. So, the new proposed method uses a global calibration dataset as the default set of parameters that tape cartridges 20 and tape drives 26 will use; while the per tape calibration data set is used only when the system must recover from an error condition by first calibrating the tape if needed. Therefore, this new process eliminates the need for calibrating every new uninitialized tape cartridge 20 causing excessive delays and potential head wear for the user's drives.

More particularly, in many embodiments, the method of the present invention includes the generation of the global calibration data from the calibration of certain subsets of tape cartridges 20 from the population of tape cartridges 20 in any given category (tape substrate material, servo writers, etc.) at known environmental conditions. Subsequently, the global calibration data can be applied during usage of uncalibrated tape cartridges 20 from a given category at current environmental conditions so that a drive controller 268 (illustrated in FIG. 2) of the tape drive 26 can selectively adjust a tape tension based on the global calibration data to more effectively establish proper alignment between a tape head assembly 256 (illustrated in FIG. 2) of the tape drive 26 and the tape 250 (alignment of writers and readers with tracks), without the need to calibrate each tape cartridge 20 individually.

In some embodiments, when it is determined that the tape tension cannot be adjusted sufficiently to ensure full and proper alignment relative to all tracks on the tape 250, the method can further include implementation of an algorithm where the outermost data tracks are not used for writing data. While such algorithm functions to sacrifice some data capacity, it does so in a manner that better inhibits the creation of hard errors.

In other embodiments, the implemented algorithm can be configured to ignore any calibration data and not adjust the tape tension if it is determined that the tape cartridge and tape drive are operating under conditions of a stable environment.

The library housing 14 is configured to retain various components of the tape library 10. For example, in the embodiment illustrated in FIG. 1, the plurality of storage slots 18, the rack assembly 22 including the rack(s) 32, the retrieval assembly 24, the one or more tape drives 26 of the tape drive system 12, the power supply 28, the library control system 30, and the climate controller 35 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped cross-section or any other suitable shaped cross-section. In many embodiments, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the tape cartridge(s) 20. More particularly, in various embodiments, each of the storage slots 18 is configured to receive and retain a single tape cartridge 20. It is noted that no tape cartridges 20 are shown as being retained within the storage slots 18 in FIG. 1 for clarity.

The tape library 10 can include any suitable number of storage slots 18, and/or the tape library 10 can be designed to retain any suitable number of tape cartridges 20. Moreover, the storage slots 18 can be arranged within the tape library 10 in any suitable manner. For example, in certain embodiments, the tape library 10 can include forty storage slots 18 arranged in two four-by-five storage areas. More particularly, in this embodiment, the tape library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the tape library 10 can include greater than forty or fewer than forty storage slots 18 and/or the storage slots 18 can be arranged in a different manner than is illustrated and described in relation to FIG. 1. For example, in certain non-exclusive alternative embodiments, the tape library 10 can be configured to include hundreds or even thousands of storage slots 18, each being configured to receive and retain a separate tape cartridge 20.

The design and configuration of the rack assembly 22 can be varied to suit the specific requirements of the tape library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a tape cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The retrieval assembly 24 selectively, such as upon request of a user or host application, retrieves and moves the tape cartridge 20 as desired between the storage slots 18 and the tape drives 26. In particular, during use, upon receiving a signal from the library control system 30 to access a certain tape cartridge 20, the retrieval assembly 24 can be manipulated to physically retrieve the requested tape cartridge 20 from its associated storage slot 18 in the tape library 10. Subsequently, the retrieval assembly 24 moves the tape cartridge 20 to an appropriate tape drive 26, and inserts the tape cartridge 20 into a drive housing 40 of the tape drive 26 so that the requested read/write operations can be performed. Upon completion of the requested read/write operations, the retrieval assembly 24 can then return the tape cartridge 20 to an appropriate storage slot 18.

It is appreciated that although a single retrieval assembly 24 is illustrated in FIG. 1, the tape library 10 can be designed to include more than one retrieval assembly 24. For example, in one non-exclusive alternative embodiment, the tape library 10 can include two retrieval assemblies 24 that function in different portions of the tape library 10 and/or that provide redundancy in the event that one of the retrieval assemblies 24 fails.

The one or more tape drives 26 can be configured for reading and/or writing data with respect to the tape cartridge 20. The number of tape drives 26 provided within the tape library 10 can be varied to suit the specific requirements of the tape library 10. For example, in certain embodiments, the tape library 10 can include three tape drives 26 that are stacked substantially one on top of another (with limited spacing therebetween). Alternatively, the tape library 10 can include greater than three or fewer than three tape drives 26 and/or the tape drives 26 can be positioned in a different manner relative to one another. For example, in certain non-exclusive alternative embodiments, the tape library 10 can be configured to include one hundred or more tape drives 26.

In certain embodiments, the tape library 10 can include more than a single tape drive system 12 for purposes of providing the one or more tape drives 26. For example, in some embodiments, the tape library 10 can include a plurality of tape drive systems 12, with each tape drive system 12 including one or more individual tape drives 26. In one embodiment, the tape library 10 can include three individual tape drive systems 12, with each tape drive system 12 including a single tape drive 26, to provide a total of three tape drives 26 for the tape library 10. Alternatively, the tape library 10 can include any desired number of tape drive systems 12 and/or tape drives 26.

The power supply 28 provides electrical power in a well-known manner to the one or more tape drives 26, the retrieval assembly 24, the library control system 30 and/or additional tape libraries 10. The power supply 28 can be interfaced with these components as well as with an external power source in a well-known manner using industry standard cabling and connections. Alternatively, the power supply 28 can be interfaced with these components in another manner.

The library control system 30 provides the desired and necessary control for oversight functionality of the tape library 10. The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors, and/or for controlling the climate controller 35. In another embodiment, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the tape library 10 in a different position or manner than that illustrated in FIG. 1.

The tape library 10 can use well-known industry standard cabling and communication protocols between the library control system 30 and other structures of the tape library 10. Cabling and electrical characteristics including signaling protocols can be generally standardized, and the logical message protocols can be either proprietary or standardized as known to those skilled in the art.

As shown, the tape library 10 can also include the GUI 34, such as an interactive touchscreen graphical user interface or another suitable graphical user interface, which allows the user or host to interact with and/or transmit requests or commands to and/or from the tape library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on a climate outside of the library interior 16. As noted, in certain embodiments, the climate controller 35 includes the temperature controller 36 and the humidity controller 38.

The temperature controller 36 regulates and/or adjusts the temperature within the library interior 16 of the tape library 10. The design and/or particular type of temperature controller 36 included in the tape library 10 can vary. For example, the temperature controller 36 can include any suitable type of cooling unit that can selectively lower the temperature within the library interior 16; and/or the temperature controller 36 can include any suitable type of heating unit that can selectively increase the temperature within the library interior 16. In various embodiments, the temperature controller 36 can include one or more temperature sensors 42 (only one temperature sensor 42 is illustrated in FIG. 1) that can sense an ambient temperature within or outside of the library interior 16. The temperature sensor(s) 42 can have any suitable design and/or can be positioned in any suitable location(s), such as within and outside of the library interior 16 of the tape library 10. In certain embodiments, the temperature controller 36 can receive data from the temperature sensor 42, and automatically adjust and/or control the temperature within the library interior 16 in accordance with predetermined temperature standards based on such data.

The humidity controller 38 regulates and/or adjusts the humidity within the library interior 16 of the tape library 10. The design and/or particular type of humidity controller 38 included in the tape library 10 can vary. For example, the humidity controller 38 can include any type of humidifier or dehumidifier, or any other suitable type of humidity controller 38 that can selectively change (raise or lower) and/or control the humidity within the library interior 16. In various embodiments, the humidity controller 38 can include one or more humidity sensors 44 (only one humidity sensor 44 is illustrated in FIG. 1) that can sense the humidity within or outside of the library interior 16. The humidity sensor(s) 44 can have any suitable design and/or can be positioned in any suitable location(s), such as within and outside of the library interior 16 of the tape library 10. In certain embodiments, the humidity controller 38 can receive data from the humidity sensor 44, and automatically adjust and/or control the humidity within the library interior 16 in accordance with predetermined humidity standards based on such data.

Figure 2:
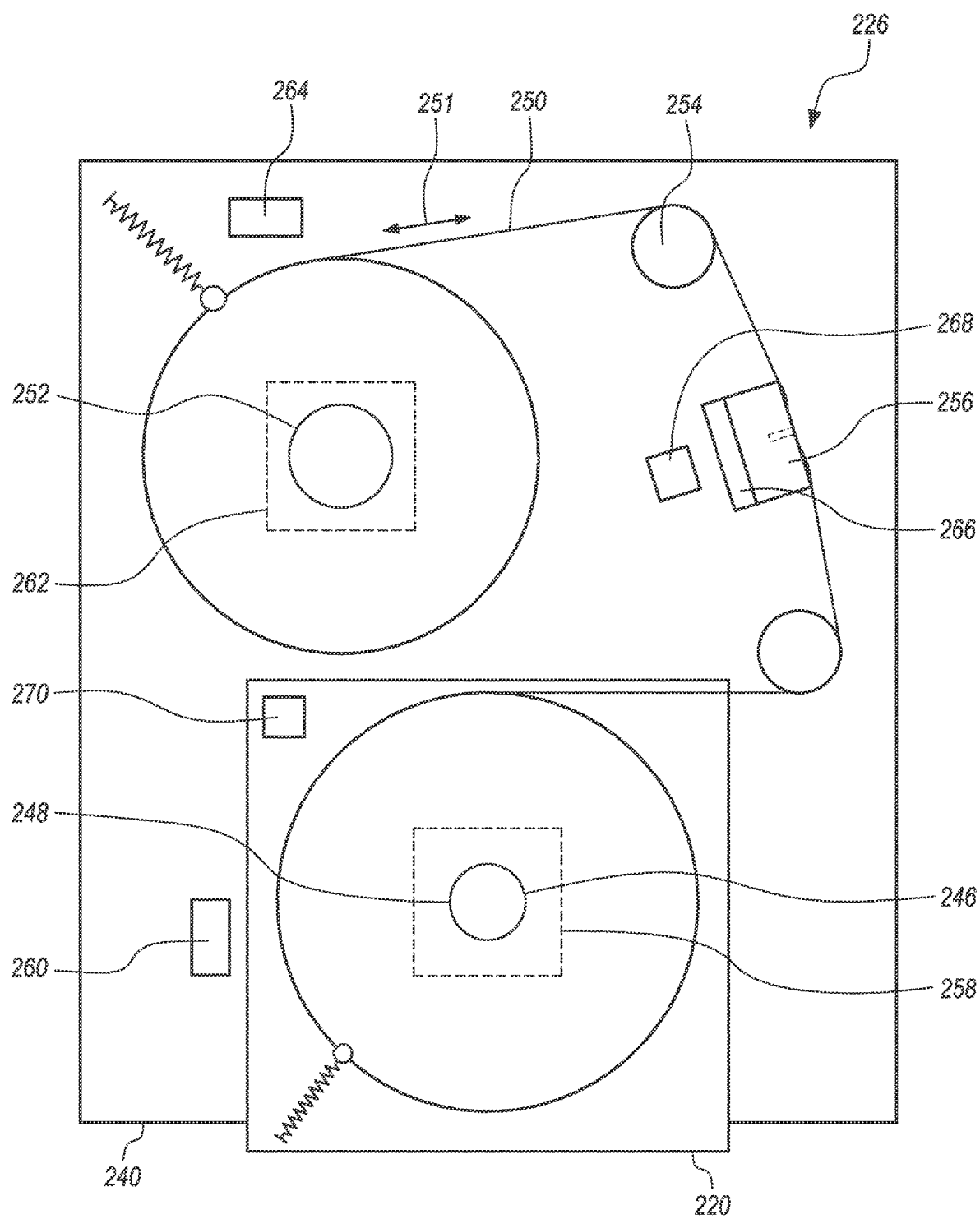
FIG. 2 is a simplified schematic top view illustration of a magnetic tape drive having features of the present invention, and a magnetic tape cartridge that has been inserted into the magnetic tape drive, which can be included as part of the tape library system illustrated in FIG. 1.

FIG. 2 is a simplified schematic top view illustration of a magnetic tape drive 226, and a magnetic tape cartridge 220 that has been inserted into the tape drive 226, which can be included as part of the tape library system 10 illustrated in FIG. 1. In FIG. 2, covers for the tape drive 226 and the tape cartridge 220 have been omitted for clarity so that the interior of such components is visible. As shown, the tape cartridge 220 is configured to retain a magnetic tape 250. It is appreciated that the tape drive 226 as shown in FIG. 2, in certain aspects, represents a generic tape drive in terms of overall size, shape and design, and is shown by way of example and not by way of limitation. In some embodiments, the tape drive 226 operates in compliance with an LTO specification, such as LTO-8 or LTO-9. Stated in another manner, in such embodiments, the tape cartridge 220 is an LTO-compatible tape cartridge.

During use of the tape drive 226, the tape cartridge 220 is inserted into a drive housing 240 of the tape drive 226 so that the tape drive 226 can read data from and/or write data to the tape cartridge 220. As shown, the tape cartridge 220 includes a cartridge reel 246 that includes and/or defines a cartridge hub 248. The magnetic tape 250 is spooled about the cartridge hub 248 of the cartridge reel 246. In certain embodiments, the magnetic tape 250 can include at least one servo track (not shown) and a plurality of data tracks (not shown) that run along a longitudinal length of the magnetic tape 250. Each of these tracks can be positioned substantially parallel to each other.

The tape cartridge 220 supplies the magnetic tape 250 to the tape drive 226. More particularly, when the tape cartridge 220 is inserted into the drive housing 240 of the tape drive 226, one end of the magnetic tape 250 is taken up within the tape drive 226 to be wrapped around a drive reel 252 included in the tape drive 226. The magnetic tape 250 traverses a predefined path 251 (illustrated as a two-headed arrow) between the cartridge reel 246 and the drive reel 252, which is defined, a least in part, by one or more rollers 254 (two are shown in FIG. 2) positioned at strategic positions along the predefined path 251. The rollers 254 may also aid in limiting gross lateral movement (i.e. in and out of the page as shown in FIG. 2) of the magnetic tape 250, sometimes referred to as lateral tape motion or "LTM".

Along the predefined path 251, the drive reel 252 moves the magnetic tape 250 across a tape head assembly 256 (also sometimes referred to herein as a "head assembly", "tape heads" or simply as a "head") that is configured to read data from and/or write data to the magnetic tape 250. In alternative embodiments, the head assembly 256 can include at least one read head, at least one write head, and at least one read/write head. In particular, the head assembly 256 is positioned in close proximity to the predefined path 251 of the magnetic tape 250 such that as the magnetic tape 250 travels in the longitudinal direction (by being wound from the cartridge reel 246 to the drive reel 252 or vice versa) the head assembly 256 can read/write data to particular tracks and longitudinal positions of the magnetic tape 250. The head assembly 256 and/or a separate head assembly can include one or more servo elements configured to read the servo track(s) of the magnetic tape 250 in order to effectively maintain proper alignment between the head assembly 256 and the magnetic tape 250. It is appreciated that the tape drive 226 can include any suitable number of heads within the head assembly 256 for purposes of reading data from and/or writing data to the magnetic tape 250. For example, in one non-exclusive embodiment, the head assembly 256 can include 32 heads for purposes of reading data from and/or writing data to 32 data tracks on the magnetic tape 250.

In some embodiments, as shown, the tape drive 226 can also include a cartridge reel motor 258 (illustrated as a box in phantom) that generates the necessary force to rotate the cartridge reel 246 at will, and a cartridge reel encoder 260, such as a sensor or detector, that is configured to output signals representing the pulse rate (or rotation rate) of the cartridge reel motor 258.

In certain embodiments, the tape drive 226 can include a drive reel motor 262 (illustrated as a box in phantom) that generates the necessary force to rotate the drive reel 252 at will, and a drive reel encoder 264, such as a sensor or detector, that is configured to output signals representing the pulse rate (or rotation rate) of the drive reel motor 262.

As illustrated in this embodiment, the tape drive 226 also includes an actuator 266 and a drive controller 268, including one or more processors and circuits, that can be communicatively coupled to the head assembly 256. The actuator 266 is configured to control the lateral position of the head assembly 256 and/or the individual heads of the head assembly 256 relative to the magnetic tape 250 based on a signal provided by the drive controller 268. As such, the actuator 266 comprises a mechanical positioner to move the head assembly 256 up or down laterally. By controlling the lateral position of the head assembly 256 relative to the magnetic tape 250, particular tracks of the magnetic tape 250 can be accessed as desired. Alternatively, the tape drive 226 can include more than one actuator 266. For example, the tape drive 226 can include a separate actuator 266 for each head.

The drive controller 268 is in communication with the actuator 266 and a number of other components within the tape drive 226. For example, although not specifically shown in FIG. 2, each of the cartridge reel motor 258, the cartridge reel encoder 260, the drive reel motor 262, and the drive reel encoder 264 can be in communication with the drive controller 268. As such, the drive controller 268 can be configured to perform various specified operations, either individually, or in combination with other software, hardware and/or firmware elements. For example, in some embodiments, the drive controller 268 can be configured to control a tape tension in the tape 250 as the tape moves along the predefined path 251. In certain embodiments, the drive controller 268 can be configured to control the tape tension based at least in part on the global calibration data that is generated through implementation of the present invention.

In certain embodiments, as shown, the tape cartridge 220 can further include a cartridge memory chip 270 (illustrated as a box, and also sometimes referred to simply as "cartridge memory") that is usable to store information related to use of the tape cartridge 220 and the magnetic tape 250 retained therein. For example, in some embodiments, the cartridge memory 270 can be used to store information and/or databases relating to one or more sets of calibration data for each tape cartridge 220. One of these calibration data sets can be the global calibration data (GCD) measured via a controlled test using multiple tape cartridges 220 and tape drives 226 representing the population of tape cartridges 220 belonging to identified groups such as substrate material, servo writer, etc. Another calibration data set can be per cartridge or per tape, as it is currently, however used only for a recovery process not as a main calibration usage.

It is appreciated that, in the process of generating calibration data for different tape cartridges and/or different tapes, there will naturally be some manner of variation from tape-to-tape, as well as some variation from tape drive-to-tape drive as different tape drives will be used during any calibration process. In the current per tape calibration method, it is further appreciated that many issues are encountered due to the natural variation from tape-to-tape as well as the natural variation from tape drive-to-tape drive. However, in the present method for generating global calibration data, because there is also a process for dehumidifying and aging the tape prior to calibration, such natural variations from tape-to-tape and tape drive-to-tape drive are somewhat narrowed such that more consistent broad-based results can be realized.

Figure 3:
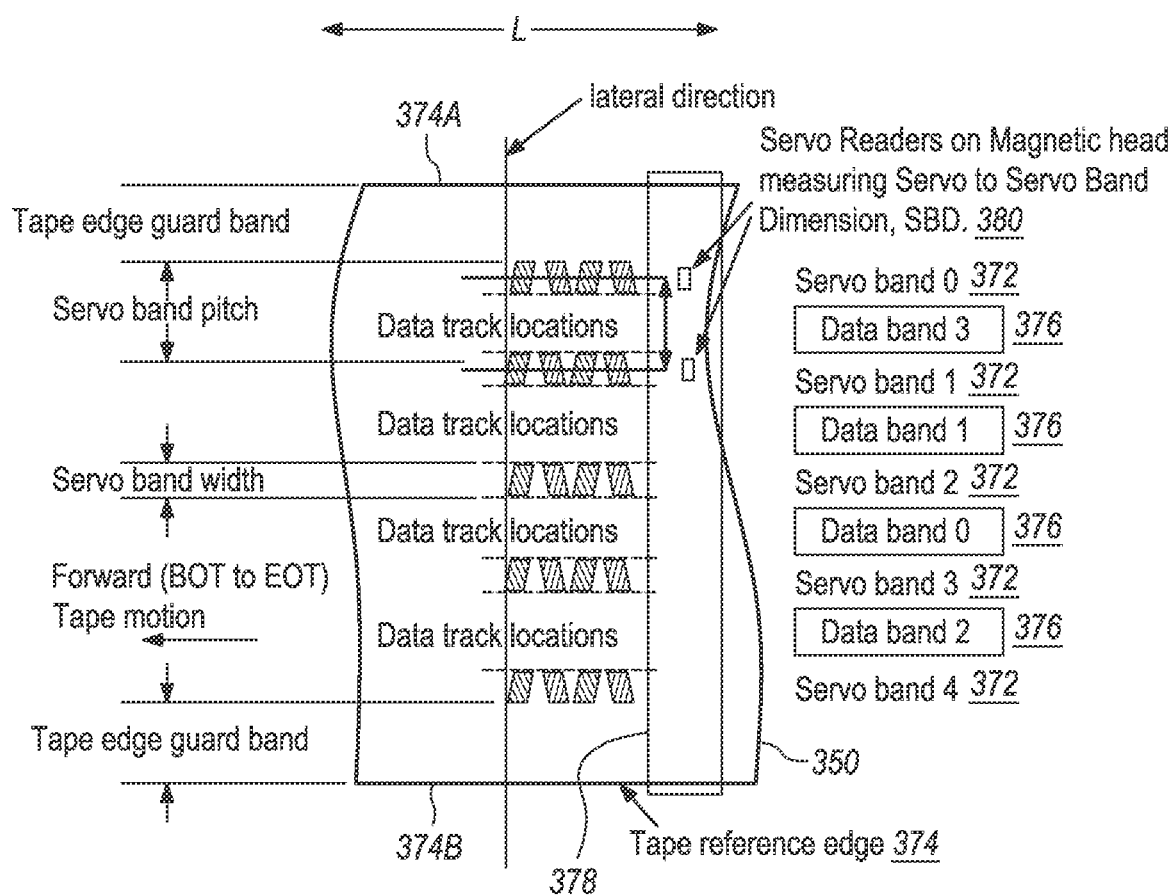
FIG. 3 is a representation of a typical tape layout for Linear Tape Open (LTO) format.

FIG. 3 is a representation of a typical tape layout for Linear Tape Open (LTO) enterprise format. In particular, as illustrated, a typical LTO-based tape 350 includes a plurality of servo bands 372 (five servo bands are shown in this embodiment), with one servo band 372 positioned near each of the lateral edges 374 of the tape 350 along a length L (illustrated with a two-headed arrow) of the tape 350, and a plurality of data bands 376 (four data bands are shown in this embodiment) that are positioned along the length L of the LTO tape 350 between the outermost servo bands 372 and that are spaced apart from one another with additional servo bands 372 positioned therebetween. For example, as shown in FIG. 3, from one lateral edge 374A to the other lateral edge 374B on this typical LTO tape 350, the tape 350 includes a first servo band 372 (labeled "Servo Band 0"), a first data band 376 (labeled "Data Band 3"), a second servo band 372 (labeled "Servo Band 1"), a second data band 376 (labeled "Data Band 1"), a third servo band 372 (labeled "Servo Band 2"), a third data band 376 (labeled "Data Band 0"), a fourth servo band 372 (labeled "Servo Band 3"), a fourth data band 376 (labeled "Data Band 2"), and a fifth servo band 372 (labeled "Servo Band 4"). It is appreciated that the labeling of the data bands 376 is provided to demonstrate the typical order in which the data bands 376 are written to on the typical LTO tape 350, i.e. first write to Data Band 0, next write to Data Band 1, then write to Data Band 2, and finally write to Data Band 3. More particularly, during the writing process, the magnetic tape 350 moves across a write head in both the forward and reverse directions in a series of data wraps, with the writing occurring consecutively through data band 0, data band 1, data band 2 and data band 3. The write head is somewhat wider than the data tracks that are ultimately being written to the magnetic tape 350, such that each data wrap overlaps the previous data wrap within each data band 376 in a process referred to as shingle writing.

An exemplary tape head 378 is also shown as being positioned over a portion of the tape 350. Read and/or write heads may be positioned on either module of the tape head 378, and may be used to read data from and/or write data to the data bands 376. The tape head 378 may also include servo readers 380 (also referred to as "servo heads") which may be used to read the servo patterns in the servo bands 372.

A typical LTO-based tape has a tape length of 1000 meters, with changes occurring in its lateral dimensions with the tape 350 being wrapped around the cartridge hub 248 (illustrated in FIG. 2). Stresses in the tape pack result in creep that is change in lateral dimensions of the tape media wrapped around the cartridge hub 248 over time. These stresses tend to act in both radial and circumferential directions, and are functions of the radial position in the tape pack, as well as storage time. Cartridge creep and lateral dimensional change from BOT to EOT where BOT is outer wrap position and EOT is the inner wrap position In current LTO format, as shown, the tape 350 has four data bands 376 and five servo bands 372, thus resulting in four servo-to-servo band regions, with each region being divided into multiple sections (such as typically 80-100 regions for a 1000-meter tape). Pursuant to current LTO-9 specification, the tape drive technology uses a dimensional calibration method to measure sectional tape lateral dimensions using servo-to-servo band distance (SBD) data sensed by the servo readers at least one in each data band. The typical tape drive, with its built-in measurement algorithm, calibrates the media if the media is new and uninitialized, which typically takes an hour to measure. This per tape calibration process by the tape drive requires tapes to be at equilibrium stage which is at user environmental conditions, especially in terms of humidity, and aged sufficiently to make sure measurements reflect the lateral dimensions of the tape both at minimum humidity conditions and in an aged situation, such that these measurement can later be used by the same or other tape drives to control the tapes lateral dimensions by using tape tension as the control mechanism which is used to stretch the tape 350 if its dimensions are sensed to be wider than the calibrated values. However, this per tape calibration process is extremely inefficient and costly since each tape requires about an hour to calibrate. Also, equilibrium stage in terms of low humidity and aged media is not something that can happen in an hour time, therefore, the concept is important, but the process is very inefficient.

LTO or Enterprise tape media both have same or similar servo patterns based on timing tracking servo format using chevron patterns written to the tape identifying multiple data bands and track locations for each data band. Tapes are typically produced by different servo writers which may have different tolerances introducing variations amongst the produced media. Also, temperature and humidity may result in lateral dimensional change affecting the servo band-to-servo band dimensions for a given cartridge. Tapes dimension from BOT to EOT may also change due to the packing tension affecting the inner layers where inside layers may be wider than the outside ones again changing lateral dimension of the tapes. In addition to these, aging is another lateral dimensional change contributor resulting in a one-time reduction in later dimensions. Tape tension is a typical means for a tape drive to control the lateral dimensions of the tape, but it has its limits. Therefore, to place the tracks accurately between the servo bands, the drive firmware and electronics must have a stable target that reflects the true dimensions of the tape 350, which is typically considered as the aged with minimal humidity condition such as less than 30% RH. Such a calibration process is a means to establish these reference values, which are a set of numbers that represent lateral dimensions for each servo-to-servo band (there are 5 servo and 4 data bands in LTO currently) from BOT to EOT that are sectioned by fixed length of tape in meters. For example, for a 1000-meter tape with ten-meter sections, there will be 100 sections, each having a calibration data for each band.

As described, the basic concept of the present invention is to establish one or more sets of calibration data that are stored in each cartridge internal memory chip (CM), where one of these calibration data sets is the Global Calibration Data (GCD) measured via a controlled test using multiple cartridges and drives representing the population of cartridges belonging to the identified categories such as substrate material, servo writer etc. The other calibration data set can be per cartridge as it is currently, however such calibration data set will be used only for a recovery process, and not as a main calibration usage.

Figure 4:
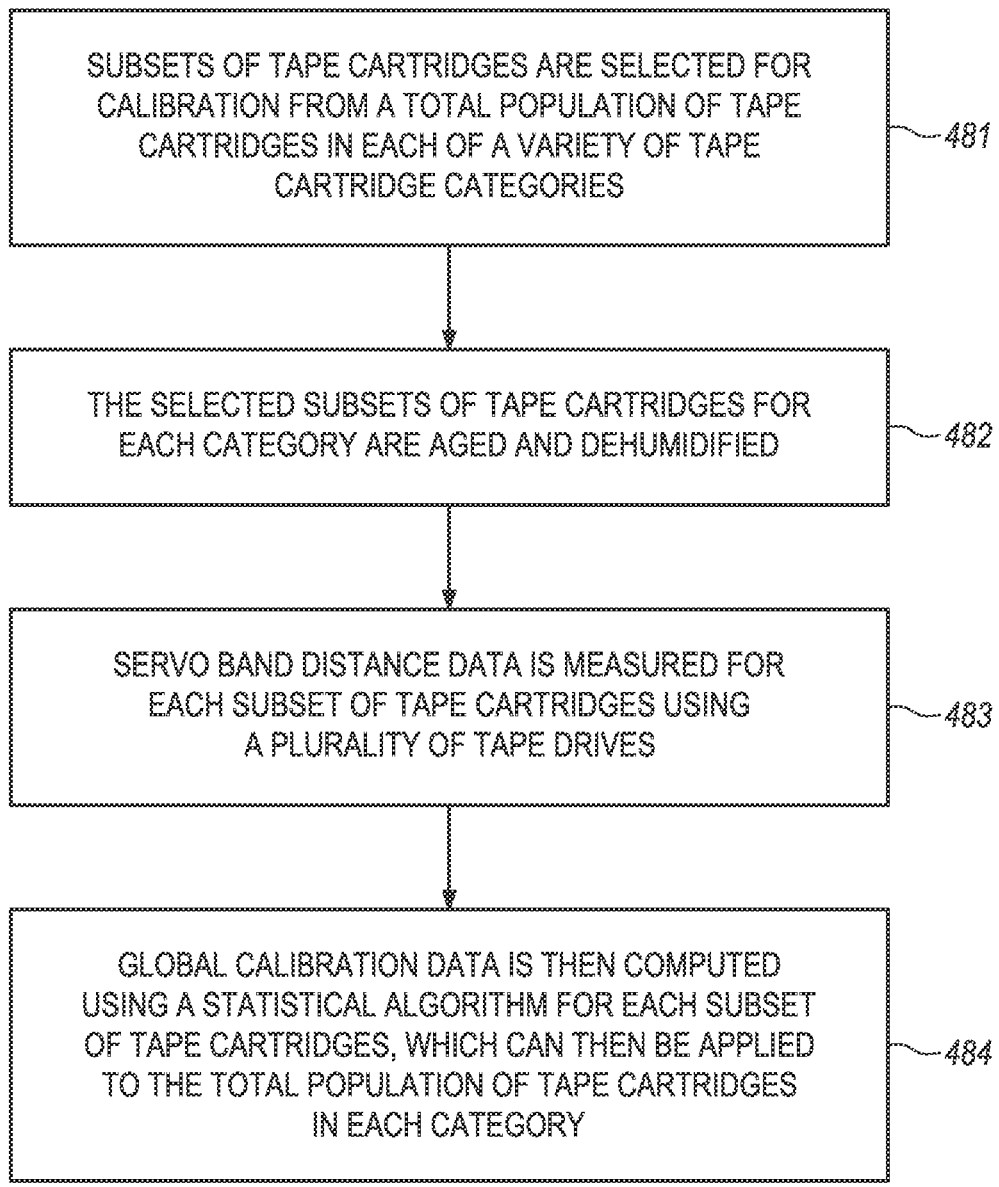
FIG. 4 is a simplified flowchart illustrating a representative example of a manufacturing process including collection of global calibration data sets.

FIG. 4 is a simplified flowchart illustrating a representative example of a manufacturing process including collection of global calibration data sets. It is appreciated that the steps specifically illustrated and described herein can be modified somewhat and still be within the intended scope and breadth of the present invention.

At step 481, subsets or samples of tape cartridges are selected for calibration from a total population of tape cartridges in each of a variety of tape cartridge categories. For example, in various embodiments, global calibration data can be established statistically using a Design of Experiments where sample cartridges are selected from various categories including one or more of different tape substrate materials, different servo writers, different rolls, different date codes, different lots, different pancakes, different pancake locations within a roll, different inner and outer pancake positions, different production dates, etc. It is appreciated, however, that in some implementations, tape cartridges can be selected to represent certain common characteristics such as substrate materials and servo writers, where these groups may have common dimensional features allowing them to be represented by a common calibration data set.

Stated in another manner, the initial selection of representative subsets of tape cartridges can incorporate a 6-sigma Design of Experiment (DOE) based test or similar methods that are used to establish optimum Global Calibration Data values for each control group such as but not limited to:

(i) Substrate—such as Polyethylene Naphthalate (PEN), Polyethylene Terephthalate (PET), Spaltan®, Polyaramid (PA), Polyimidebenzoxazole (PIBO), or a variety of other potential viscoelastic materials; and (ii) Servo Writer serial number.

In such process, tape cartridge selection for each group will ensure the samples are from a randomized process such that tape cartridges are selected from representative categories such as different rolls, different date codes, different pancake locations within a roll, inner and outer pancake positions, etc.

The number and/or percentage of tape cartridges that are included in any given categorical subset of tape cartridges can be varied in comparison to the total population of tape cartridges in any given category. It is merely important that the selected subset of tape cartridges in any given category of tape cartridges is less than the total population of tape cartridges in such category. More particularly, with the present invention, representative calibration of a plurality of tape cartridges (in a given category) can be accomplished by calibrating a subset of the plurality of tape cartridges that is less than a total number of tape cartridges included in the plurality of tape cartridges. For example, in one non-exclusive embodiment, the subset of tape cartridges that are actually calibrated can be one less than the total number of tape cartridges included within the plurality of tape cartridges. In other non-exclusive alternative embodiments, the subset of tape cartridges that are actually calibrated in any given category can be less than approximately 95%, 90%, 85%, 80%, 75%, 70%, 65%, 60%, 55%, 50%, 45%, 40%, 35%, 30%, 25%, 20%, 15%, 10% or 5% of the total number of tape cartridges in the plurality of tape cartridges.

At step 482, the selected samples or subsets of tape cartridges for each category are aged and dehumidified. More particularly, the selected samples or subsets of tape cartridges are preconditioned at a controlled environmental setting (temperature and humidity) such that subsets of tape cartridges are aged and subsequently dehumidified to make sure when calibration starts each selected tape cartridge is in its ideal equilibrium condition that is aged with low humidity content (less than 30% RH) and at a low temperature setting. It is further appreciated that aging can be accelerated by periodic tape shuttling at controlled tension using high temperatures and low or high humidity extreme allowed conditions per media specification.

In different embodiments, dehumidification can be done either at the same time of aging if the ageing humidity set point is at low humidity (less than 30% RH), or afterward with high temperature and low humidity condition (less than 30% RH). It is again appreciated that tape shuttling with periodic loads at a controlled tape tension may be used to help with the dehumidification process.

It is further appreciated that by aging and dehumidifying the subset of tape cartridges prior to actual calibration provides certain advantages in the overall calibration process. For example, while tape-to-tape variation and tape drive-to-tape drive variation can cause various issues in a normal per tape calibration process, by aging and dehumidifying the subset of tape cartridges prior to actual calibration, any tape-to-tape variation and tape drive-to-tape drive variation can be narrowed, thereby enabling more consistent results across the population of tapes and tape drives.

Thus, calibration is not done until after the tape cartridges are acclimated and well-aged in ideal environmental conditions (no humidity and pre-aged media by storing them under high temperatures) so the calibration conditions are ideal. Pre-aging may also include periodic tape shuttling in high temperature to accelerate aging of the media. Thus, with this manufacturing method, the global calibration data is generated when the tape cartridges in each category are in known environmental conditions.

At step 483, servo band distance data is measured for each subset of tape cartridges using a plurality of different, alternative tape drives. More particularly, when the selected subsets of tape cartridges have reached an equilibrium condition (aged and dehumidified with temperature setting at low temperature per media specification), the calibration process will take place using a round robin algorithm where each tape cartridge is calibrated by different tape drives. The sample size for the subset of tape cartridges will be based on the characteristic of the overall group or category, but will ensure a statistically significant data collection with a sample size greater than 10. The number of tape drives used will be based on a minimization of data skews where the number of tape drives used should be greater than or equal to three. In certain example implementations, to cover a drive head dimensional tolerance, ten or more tape drive samples from different tape drive lots with different dimensional tolerancing may be selected. For instance, a subset of 100 tape cartridges with ten tape drives will typically require less than a week to calibrate all tape cartridges with all tape drives.

At step 484, a global calibration data set is computed for each subset of tape cartridges that can then be applicable to the total population of tape cartridges in any given category. More particularly, a statistical algorithm will be used to calculate the global calibration data which all subsequently produced tape cartridges will have this data set stored in its internal memory chip, CM in the Global Calibration Data section.

Once these averaged calibration values as defined above are established, now the media vendor will simply use these during production by simply writing these values to the same location where the tape drive would have written. With such process, now tape cartridges are pre-calibrated, with no special costly equipment and no extra time. As such, only a test system is used to pre-establish the optimized set of values where tape cartridges from same condition all have the same values to work with.

It is appreciated that this process may be repeated periodically such as every six months or once a year to make sure the production process is in control and, if changes are detected, the production is analyzed and new values may be calculated to replacing the previous ones if needed. Also, if a media vendor's process changes for manufacturing this test will be redone but only once. However, it may be a requirement that media vendors may decide to do this every year to make sure the process is in control.

It is further appreciated that differing environmental conditions can cause the lateral tape dimensions to expand or contract, thereby creating a potential misalignment between the tape head of the tape drive and the tape. Thus, it is desired to compensate for whatever current environmental conditions may exist during use of any tape cartridge. During actual application of the global calibration data, an uncalibrated tape cartridge can be selected for use. Based on then current environmental conditions, the tape drive and/or the drive controller can employ an appropriate algorithm that utilizes the global calibration data for the appropriate category (or grouping of categories in some instances) to adjust the tape tension to compensate for the differing environmental conditions so that proper alignment can be established between the tape head and the tape.

As described, the goal is to measure ideal lateral dimensions of every tape, which is when the tape is dry and cold (no humidity) and after it is aged, but wound and loaded in a tape cartridge. The measurements are to be made using fixed distance along the length of wound tape in the tape cartridge from BOT to EOT for all servo bands.

The current method can also employ additional algorithms and implementations. For example, tape cartridge calibration values based on sections of tape BOT to EOT and across multiple data band regions stored from precomputed tape cartridges using same or similar process and manufacturing is stored in chip memory (CM). Another region in CM with the same data format can also be assigned for the tape drive based on per tape individual calibration if some use cases require. As described, the drive algorithm may decide to use from either set if environmental conditions require, but this method is not the preferred concept since per tape calibration will require long delays. In some applications, the tape servo format with LPOS (Longitudinal Position information on tape per LTO format definition) may be used to encode the same factory-based calibration values in addition to the CM stored data.

Figure 5:
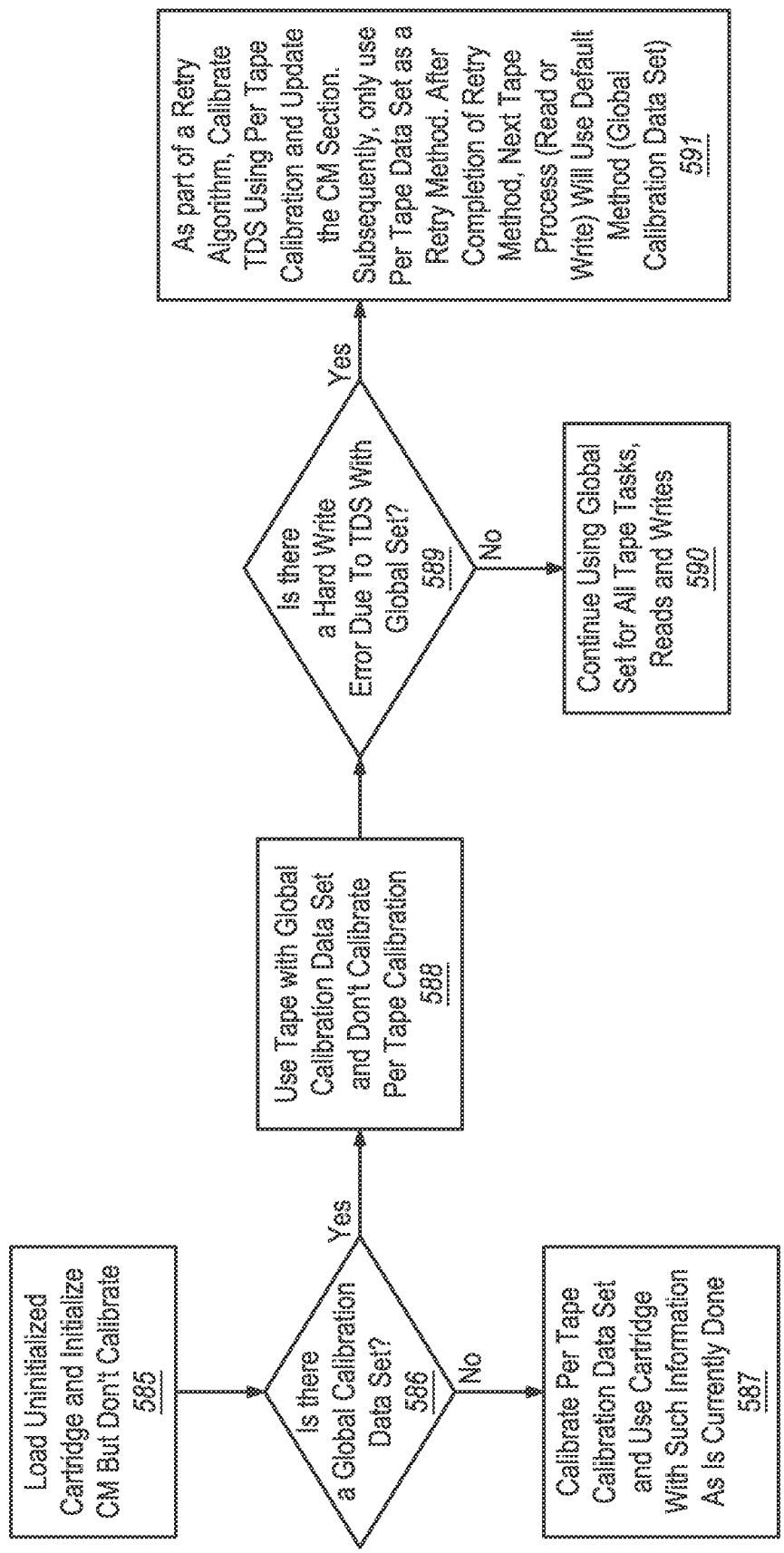
FIG. 5 is a simplified flowchart illustrating typical tape drive firmware processes for using global calibration data or per tape calibration.

FIG. 5 is a simplified flowchart illustrating typical tape drive firmware processes for using global calibration data or per tape calibration.

At step 585, an uninitialized tape cartridge is loaded and the cartridge memory (CM) is initialized, but the tape cartridge is not calibrated.

At decision step 586, the query is posed as to whether or not there is a global calibration data set for the tape cartridge, which had been previously generated for tape cartridges of that category.

If the answer is no, then at step 587, per tape calibration is conducted for the tape employing such information, as is done currently.

However, if the answer is yes, then at step 588, the tape cartridge is used employing the global calibration data set. In this instance, per tape calibration is not conducted for the tape cartridge.

Subsequently, at decision step 589, the query is posed as to whether or not there is a hard write error due to TDS with the global calibration data set.

If the answer is no, then at step 590, the global calibration data set is continued to be used for all tape tasks, reads and writes.

If the answer is yes, then at step 591, as part of a retry algorithm, one can calibrate TDS using per tape calibration and the CM section is updated. Subsequently, only the per tape data set is used as a retry method. Then, after completion of the retry method, the next tape process (read or write) will use the default method, which entails use of the global calibration data set.

Unfortunately, despite the effective usages of the system and method (algorithm) of the present invention, in tape drive usage, there might be cases where drive tension control may not be sufficient to manage TDS with the calibration data. In such instances, typical write operations may be stopped due to them generating hard write errors. In one implementation, to avoid such hard write errors, the tape drive firmware can be programmed into writing onto the tape using only the inner 30 channels (for a typical 32 channel head format), while disabling the outer edge channels. This will result in slight data capacity loss, but will allow the tape drive and tape to be format compliant and still be able complete the write process. It is appreciated that this concept can be expanded to other head formats with more channels.

It is also appreciated that in other embodiments, the system and method (algorithm) of the present invention can be further configured to have the drive controller ignore any global calibration data and not control any adjustments to tape tension if it is determined that the tape cartridge is operating under conditions of a stable environment.

In still other embodiments, the system and method (algorithm) of the present invention can also be configured to reject tape cartridges if it is determined to be too far off from a standard calibration curve from the subset of tape cartridges used to generate the global calibration data.

Thus, in various implementations of the present invention, the inventive concept is to establish one or more sets of calibration data that can be stored in an internal memory chip (CM) of each tape cartridge, where one of these data sets is the global calibration data (GCD) measured under known environmental conditions via a controlled test using multiple tape cartridges and tape drives representing the population of tape cartridges belonging to the identified categories, such as substrate material, servo writer, etc. The global calibration data can be subsequently utilized when an uncalibrated tape cartridge is being used so that a tape tension can be selectively adjusted based on current environmental conditions versus the known environmental conditions that existed at the time of generation of the global calibration data during the sample-based calibration procedure. Thus, with such method, proper alignment can be more effectively established between tape head and tape (alignment of writers and readers with tracks), without the need to calibrate each tape cartridge individually.

Another calibration data set can be per cartridge or per tape, as it is currently, however such data would only be used only for a recovery process not as a main calibration usage. Thus, data from the per tape calibration method would only be used when the system must recover from an error condition by first calibrating the tape if needed, such as when the system requires it due to a corner case error or recovery case. For instance, using the global calibration data set, the tape drive may find that the tape tension required is outside the applicable range, and in this error case, the tape drive may require the use of the per tape calibration process by implementing the special one-time calibration only due to this condition. This method allows global calibration data to cover typical normal distribution of tape cartridges, and per tape will be needed only for corner cases, unlike the current system where per tape calibration is used for all tape cartridges, causing economic and head wear problems especially for the large hyperscale users.

In certain embodiments, when the tape tension cannot be adjusted sufficiently to ensure full and proper alignment relative to all tracks on the tape, even including the per tape calibration method, the method can further include implementation of an algorithm where the outermost data tracks are not used for writing data. While such algorithm functions to sacrifice some data capacity, it does so in a manner that better inhibits the creation of hard errors.

Therefore, the joint use of global calibration data, which is applicable for most tape cartridges, and per tape calibration, typically covers corner case error conditions as a recovery calibration process, and can further entail eventually writing without using the top and bottom edge tracks in case the tape drive fails to provide tension control due to exceeding its allowable range, is a key embodiment of the present disclosure.

In summary, with tape and tape drives operating over a wide environmental range, this factory-based calibration method will provide a robust low latency, low cost, and highly reliable means to control tape TDS. There are typically two ranges for environmental requirements, a narrow, recommended temperature and humidity range, and a wider allowable range. Recommended is typically the one used by customers where data reliability and performance is required, whereas allowable is a range within which the system will function without causing hard read errors, although performance may be compromised. This unique factory-based calibration as described above is ideal for recommended range where TDS variations are minimum, enabling such TDS control using a pre-established optimal set of TDS calibration data. In current applications where only tape drive-based per tape calibration methods are used resulting in excess tape motion, long latencies and costly operations, the repeatability of each calibration at unknown conditions where the final operation takes place may result in more variations in TDS calibration compared to using a pre-determined set of factory calibration values for the same exact measurement. Also, since the factory calibration process will also use the same tape drives and algorithms as the current per tape calibration, the overall system performance is better controlled even though it is based on a sample-based concept rather than per-tape-based concept. The proposed sample-based factory calibration concept, as proposed in this application, is done in a well-controlled environment with similar tape drives and TDS measurement algorithms implemented by drive firmware and drive electronics selected from a large sample of tape drives, so it can represent typical drive to drive head dimensional tolerance variations. With the proper sampling process to identify critical groups where each group may have its own set of TDS calibration values such as substrate, servo writer, pancake locations etc., the proposed factory-based calibration offers a more stable and repeatable method of controlling individual TDS during actual usage. Current per tape calibration with long latencies and excessive tape motion across the actual user's drive heads lacks the repeatability and also most critical aspect of TDS, the aging component, since it is nearly not feasible to age the media effectively by even moving it over an hour of time in the drive at some environmental conditions prior to calibrating the TDS for that specific media. However, in the present approach done at factory using the same drive process, one has the ability and flexibility to pre-age the sample media by periodic shuttling at high temperatures and low humidity conditions with a combination of shuttling and unloading periodically. This can be done at a factory much more conveniently than at the field with user systems.

Another feature of the invention is to use six-sigma based statistical process to optimize the factory calibration values so an optimal set of values can be computed for the final factory set data to be stored in each cartridge. This process can always be used as a process control mechanism to ensure the produced media is stable and no unexpected variations due to unknown substrate or other manufacturing variations. This process can happen periodically at the factory to ensure a stable production process. If variations are detected, precautions can be made at the factory rather than having to deal with these issues at the user application, which can be too late.

It is appreciated that the present calibration system and method can be implemented in a number of different ways. For example, one option is to use the cartridge manufacturer's factory to generate the global calibration database and programming the CM of production tape cartridges before they are shipped. In such option, drive firmware requires modification to initialize tape cartridges, but not calibrate them at initial loads. In such implementation, per tape calibration will be done only as a retry recovery method from a detected error condition.

Another possible option is having library robotics, firmware, and electronics program tape cartridges with a pre-established global calibration database. This can be done by a modified drive firmware where the tape drive can load the tape cartridges and let the library read CM contents and reprogram these one by one with the previously computed global calibration database either provided by the media vendor or done by the library supplier themselves. Drive firmware modification will still require certain changes as described above, in addition to allowing the library to read and modify certain locations of the CM to program the global calibration database. This method enables media vendors to sell tape cartridges as they have always done and library vendors to manage determination of global calibration database and programming of the tape cartridge CM.

A third option is for the tape drive to manage this process. The tape drive can have the precomputed global calibration database stored in its nonvolatile memory. Either it can use the internal memory for the global calibration data section or transfer its global calibration database to the cartridge CM during the initialization period at first load.

Still another option is for the tape drive to have the global calibration database, and the tape cartridges to have the per tape calibration database just like today, but the tape drive will be configured to use the global calibration data every load, and the tape drive will only use the per tape calibration data if it encounters an error case for retry.

Thus, the idea of the present invention is to use a pre-established global calibration data to control the media TDS for writing and reading, where per tape calibration is used only for recovery process.

The currently employed process of using only per tape calibration data uses a random drive and media at a random environmental condition where the drive specifications recommend the conditions to be within the recommended range per specification, although there is no guarantee that the measurements will or can be done at the ideal conditions that is cold and dry such as 15 degrees C. and 20% RH or less. The tape drive's current attempt to achieve a low humidity and pseudo-aged condition is to shuttle the tape at its initialization environment for about an hour, but there no guarantee that this will result in achieving the ideal conditions as stated above. Therefore, given the variations from drive to drive, unknown and uncontrolled environmental conditions and inability to achieve aged condition, the current process will have critical variations even though it attempts to implement a per tape type calibration.

On the other hand, the proposed solution based on a unique global calibrated database offers an improved solution based on a very controlled calibration process that is not feasible per tape. Global calibration is done at very controlled environmental conditions and with media that is aged, therefore the values computed will represent the population behavior with a set of stable and accurate values as long as the sample size is statistically significant and process control is stable. Therefore, the proposed method based on global calibration data can be more accurate and repeatable than the currently employed per tape calibration process.

It is understood that although a number of different embodiments of a calibration system have been illustrated and described herein, one or more features of any one embodiment can be combined with one or more features of one or more of the other embodiments, provided that such combination satisfies the intent of the present invention.

While a number of exemplary aspects and embodiments of the calibration system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for generating calibration data useful for calibrating a plurality of tape cartridges, the method comprising the steps of:
    selecting a subset of tape cartridges from the plurality of tape cartridges, the subset of tape cartridges having fewer tape cartridges than the plurality of tape cartridges;
    calibrating each of the subset of tape cartridges using a plurality of tape drives to generate global calibration data;
    selecting one of the plurality of tape cartridges that is not included within the subset of tape cartridges; and
    calibrating the one of the plurality of tape cartridges using the global calibration data generated via the calibrating of each of the subset of tape cartridges.

2. The method of claim 1 further comprising the step of storing the global calibration data in an internal memory of each of the plurality of tape cartridges.

3. The method of claim 1 wherein the step of calibrating each of the subset of tape cartridges includes individually calibrating each of the subset of tape cartridges using each of the plurality of tape drives.

4. The method of claim 1 wherein the step of selecting the subset of tape cartridges includes the subset of tape cartridges including less than approximately 25% of the number of tape cartridges in the plurality of tape cartridges.

5. The method of claim 1 wherein the step of selecting the subset of tape cartridges includes the subset of tape cartridges including at least ten tape cartridges; and wherein the step of calibrating each of the subset of tape cartridges includes the plurality of tape drives including at least three tape drives.

6. The method of claim 1 wherein the step of calibrating each of the subset of tape cartridges includes calibrating each of the subset of tape cartridges under known environmental conditions.

7. The method of claim 6 further comprising the step of aging and dehumidifying each of the subset of tape cartridges prior to the step of calibrating each of the subset of tape cartridges.

8. The method of claim 1 wherein the step of calibrating the one of the plurality of tape cartridges includes the steps of calibrating the one of the plurality of tape cartridges in a first tape drive that includes a drive controller; and selectively adjusting a tape tension of a tape retained within the one of the plurality of tape cartridges with the drive controller based at least in part on the global calibration data generated via the step of calibrating of each of the subset of tape cartridges.

9. The method of claim 8 wherein the step of selectively adjusting includes selectively adjusting the tape tension of the tape retained within the one of the plurality of tape cartridges with the drive controller based at least in part on the global calibration data generated via the step of calibrating of each of the subset of tape cartridges in comparison to actual environmental conditions existing during calibration of the one of the plurality tape cartridges.

10. The method of claim 8 wherein the step of calibrating the one of the plurality of tape cartridges further includes the step of controlling the first tape drive with the drive controller to write data to fewer than a total number of data tracks on the tape when the drive controller determines that the tape tension cannot be adjusted sufficiently to ensure accurate alignment between a head assembly of the first tape drive and each of a plurality of data bands on the tape.

11. The method of claim 1 wherein each of the plurality of tape cartridges is included within a category of tape cartridges that includes at least a first characteristic.

12. The method of claim 11 wherein the first characteristic includes one of a material of a tape substrate of a tape retained within the tape cartridge, and a servo writer used to write servo tracks onto a tape retained within the tape cartridge.

13. A calibration system for generating calibration data useful for calibrating a plurality of tape cartridges, the calibration system comprising:
    a subset of tape cartridges that are selected from the plurality of tape cartridges, the subset of tape cartridges having fewer tape cartridges than the plurality of tape cartridges; and
    a plurality of tape drives that are usable for calibrating each of the subset of tape cartridges to generate global calibration data;
    wherein one of the plurality of tape cartridges that is not included within the subset of tape cartridges is selected and calibrated using the global calibration data generated from calibrating each of the subset of tape cartridges.

14. The calibration system of claim 13 wherein the calibration data is stored in an internal memory of each of the plurality of tape cartridges.

15. The calibration system of claim 13 wherein each of the subset of tape cartridges is individually calibrated using each of the plurality of tape drives.

16. The calibration system of claim 13 wherein the subset of tape cartridges includes less than approximately 25% of the number of tape cartridges in the plurality of tape cartridges.

17. The calibration system of claim 13 wherein the subset of tape cartridges includes at least ten tape cartridges; and wherein the plurality of tape drives includes at least three tape drives.

18. The calibration system of claim 13 wherein the plurality of tape drives includes a first tape drive that includes a drive controller; wherein the one of the plurality of tape cartridges is calibrated in the first tape drive; and wherein the drive controller selectively adjusts a tape tension of a tape retained within the one of the plurality of tape cartridges based at least in part on the global calibration data generated via the calibration of each of the subset of tape cartridges.

19. The calibration system of claim 18 wherein the selective adjustment of the tape tension of the tape retained within the one of the plurality of tape cartridges is based at least in part on the calibration data generated via the calibration of each of the subset of tape cartridges in comparison to actual environmental conditions existing during calibration of the one of the plurality tape cartridges; and wherein the drive controller controls the first tape drive to write data to fewer than a total number of data tracks on the tape when the drive controller determines that the tape tension cannot be adjusted sufficiently to ensure accurate alignment between a head assembly of the first tape drive and each of the data bands on the tape.

20. A method for generating calibration data useful for calibrating a plurality of tape cartridges, each of the plurality of tape cartridges being included within a category of tape cartridges that includes at least a first characteristic, the method comprising the steps of:

selecting a subset of tape cartridges from the plurality of tape cartridges, the subset of tape cartridges including at least ten tape cartridges, which is less than approximately 25% of the number of tape cartridges in the plurality of tape cartridges;

individually calibrating each of the subset of tape cartridges under known environmental conditions using each of a plurality of tape drives to generate global calibration data, the plurality of tape drives including at least three tape drives;

storing the global calibration data in an internal memory of each of the plurality of tape cartridges;

selecting one of the plurality of tape cartridges that is not included within the subset of tape cartridges; and calibrating the one of the plurality of tape cartridges using the global calibration data generated via the step of individually calibrating each of the subset of tape cartridges.

* * * * *